Figure 1:
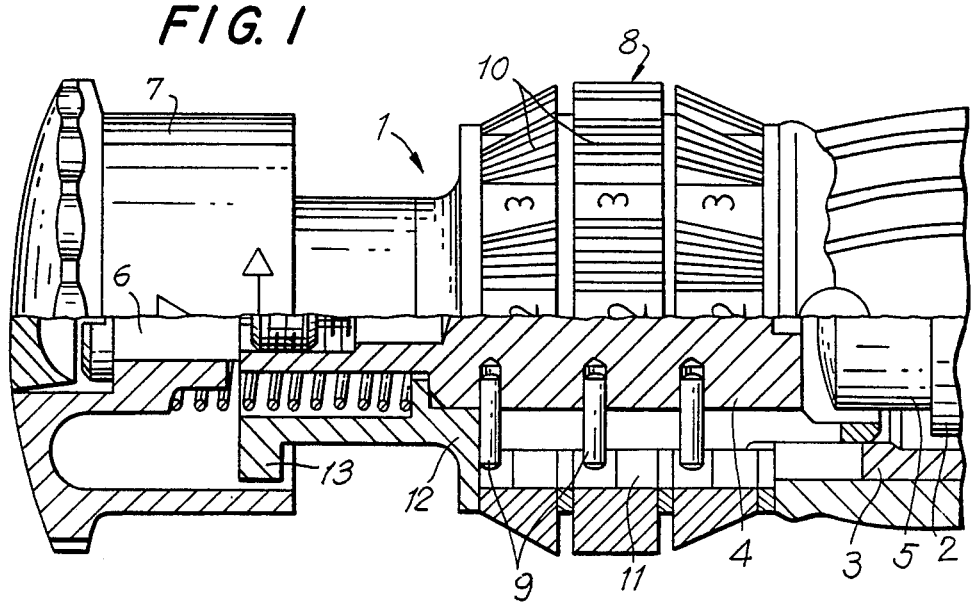

United States Patent [19]

Balina et al.

[11] Patent Number: 4,858,451
[45] Date of Patent: Aug. 22, 1989

[54] LOCK FOR HAND BRAKE LEVER OF MOTOR VEHICLE

[75] Inventors: István Balina; József Kókai; Lajos Boró; Lajos Torba, all of Budapest, Hungary

[73] Assignee: "Spiral" Autojavito Vallalat, Hungary

[21] Appl. No.: 243,187

[22] Filed: Sep. 2, 1988

Related U.S. Application Data

[63] Continuation of Ser. No. 904,871, Sep. 8, 1986, abandoned.

[30] Foreign Application Priority Data

Jan. 24, 1986 [AT] Austria .................................. 170/86

[51] Int. Cl.⁴ .............................................. F16H 57/00
[52] U.S. Cl. ............................................. 70/202; 70/213
[58] Field of Search .................. 70/181, 192, 201-202, 70/204-207, 213, 233, 247, 312, 327-328, DIG. 67

[56] References Cited

U.S. PATENT DOCUMENTS

| | | | |
|---|---|---|---|
| 1,186,378 | 6/1916 | Christensen | 70/181 |
| 4,259,856 | 4/1981 | Wingert | 70/327 |
| 4,490,997 | 1/1985 | Hughes | 70/233 |

FOREIGN PATENT DOCUMENTS

| | | | |
|---|---|---|---|
| 808529 | 5/1951 | Fed. Rep. of Germany . | |
| 512326 | 1/1921 | France . | |
| 635796 | 3/1928 | France . | |
| 454442 | 7/1950 | Italy | 70/181 |
| 1088853 | 10/1967 | United Kingdom . | |

OTHER PUBLICATIONS

Popular Science, Mar. 1987, p. 38, J. Keebler: "What's New for Your Car".

*Primary Examiner*—Robert L. Wolfe
*Attorney, Agent, or Firm*—Michael N. Meller

[57] ABSTRACT

The invention relates to a lock for the hand brake lever of a motor vehicle having a sleeve mounted on the hand brake lever, a release member movable therein to contact a pushbutton of the hand brake lever, and locking device capable of preventing movment of the release member in the locked condition. The inventive improvement is that the release member (4) is associated with a mechanism which arrests the unlocked condition of the locking device (8) after release of the hand brake and prevents shifting from this condition.

19 Claims, 6 Drawing Sheets

U.S. Patent  Aug. 22, 1989  Sheet 1 of 6  4,858,451

LOCK FOR HAND BRAKE LEVER OF MOTOR VEHICLE

This application is a continuation of application Ser. No. 904,871 filed 9/8/86 and now abandoned.

The invention relates to a lock for the hand brake lever of a motor vehicle having a sleeve connected to the hand brake lever, a release member connected to a pushbutton of the hand brake lever, and a locking device which in the locked condition prevents movement of the release member.

Among the many arrangements and solutions directed to the problem of unauthorized use of motor vehicles, the lock for the hand brake lever of a motor vehicle has great popularity because of its simplicity and ease of application. The sleeve of these locks is slid onto the lever of the hand brake and fastened thereon. The release member lies against the pushbutton of the hand brake. In the locked condition of the lock, the release member of the lock cannot be pressed in, whereby braking of the vehicle by actuating the hand brake lever cannot be released. To prevent displacement of the release member, a locking device is employed which is provided with rotatable number dials. For a predetermined combination of numbers, by means of rotation of the number dials in the unlocked position of the locking device the release member is freely displaceable and the release of the hand brake is possible. A lock of this type is disclosed in U.K. Pat. No. 1,088,853.

In practice it has been shown that the security of known locks for hand brake levers is not satisfactory. With sensitive feeling in the fingertips, sufficient aptitude and patience these locks with numeric combinations can be opened. In doing so, the point at which the number dials come to the open position can be detected by tactile sensation because a positive play between the mutually movable parts is essential.

The known locks are further burdened by the disadvantage that they do not comply with the international standards, for example, the safety regulations of the EWG. In accordance with these regulations, the release of the stopping brake of a motor vehicle during operation may not be impeded. In the case of the known locks it is possible that a number dial can be accidentally or unintentionally rotated out of the position corresponding to the unlocked condition of the locking device with the hand or with some other object, for example, a handbag or an article of clothing. In a dangerous situation, for example, when the service brake of the motor vehicle has become defective or failed, it is possible that the hand brake must be repeatedly applied and released. If in the meantime at least one of the number dials has shifted out of the unlocked condition, then the once applied hand brake cannot immediately be released, which increases the risk of an accident intolerably.

The object of the invention is accordingly to produce a lock for the hand brake lever of a motor vehicle with increased theft protection and operational reliability and which conforms also to the international safety regulations and recommendations. This object should be attained with the simplest possible means in order to retain an uncomplicated construction of the lock and the other advantages of known solutions.

In accordance with the invention the established goal is attained by means of the improvement wherein the release member is associated with a mechanism which arrests the unlocked condition of the locking device after release of the hand brake and prevents shifting out of this condition.

In an advantageous embodiment of the invention the object is achieved wherein the mechanism for preventing shifting of the locking device has a cap and a projection provided on the housing of the lock which cooperates with the cap in the arrested position, whereby the cap and the projection are relatively movable. In this case the projection is formed on the end of the sleeve which faces the cap, and the cap has a lip whereby the projection and the lip are formed with threads of large pitch which respectively extend over half of the periphery of the sleeve and cap, and the half-thread of the projection cooperates with the half-thread of the cap in the arrested position. A rotation-impeding step can be formed on the relatively movable surfaces of the projection and the lip at the end of the half-thread.

In accordance with the invention the preferred embodiment is advantageously provided with a thread pitch of the half-threads of the projection and the lip which in the axial direction is smaller than the thickness of a number dial of the locking device.

In a further advantageous embodiment the mechanism can be formed so that between the first number dial of the locking device and the housing of the lock an arresting disk is rotatably mounted coaxial with the number dials, which arresting disk has a shoulder which abuts one of the locking pins of the locking device in the arresting position, whereby the annular shoulder extends along half of the arresting disk and has a thickness smaller than the thickness of a number dial. The arresting disk can moreover be provided with a fluted outer circumference.

In accordance with a further advantageous embodiment of the invention, a stop pin is arranged in a through-hole transverse to the longitudinal axis formed in the end of the release member which faces the pushbutton of the hand brake lever, whereby in the arresting position the stop pin abuts the inner end of a longitudinal groove formed in the sleeve of the lock and is pushed out of the longitudinal groove by means of a release pin actuated externally. Therefore it is advantageous if the stop pin has a head with a diameter greater than that of the remaining part, which head in the arresting position abuts an inner shoulder of the through-hole and is loaded by a compression spring. It can moreover be the case that the externally actuated release pin is arranged in a through-hole formed in the handle of the hand brake lever near the inner end of the longitudinal groove, whereby the outer end of the release pin takes the form of a button provided in a concavity formed in the handle and the release pin is urged in the direction of the concavity by a compression spring. The compressive force acting on the stop pin can be adjusted by changing the prestress of the compression spring.

In accordance with the invention it is advantageous to provide the number dials of the locking device with dummy notches which at least partially admit the locking pins of the locking device but prevent the locking pins from being pushed therethrough.

In accordance with a further preferred embodiment an arresting disk is arranged between the first number dial of the locking device and the housing of the lock, coaxial with the number dials, the arresting disk being rotatable by means of a compression spring inserted in a recess formed in the housing. The first locking pin of the release members engages a groove in the front face of the arresting disk. The arresting disk has a radial control lever which projects through a control window of the lock.

In accordance with a further preferred embodiment, the release member takes the form of a sleeve mounted on the brake lever handle, which release member ending is a control knob the inside surface of which lies against the pushbutton of the hand brake. It is further advantageous to constantly load the release member, which is in the form of a sleeve, by means of a compression spring arranged inside the sleeve of the lock.

In accordance with a further preferred embodiment, the lock is undetachably fastened on the hand brake lever by means of a one-way clamp.

For many types of motor vehicles it is advantageous if the lock in accordance with the invention has an intermediate sleeve for the hand brake of small diameter.

In accordance with a further preferred embodiment the number dials each have the same arrangement of radial recesses in the front face thereof, the number of recesses being equal to the number of digits displaced on each number dial, which recesses for each number dial cooperate with a projection provided on a corresponding annular spring coaxially arranged next to the number dial and serving to maintain the adjusted position of the number dial.

Figure 2:
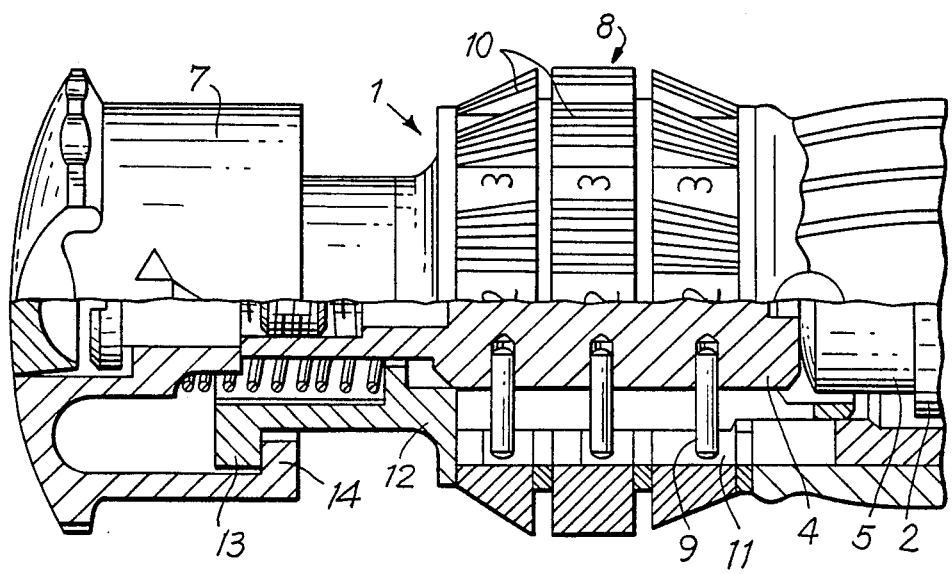
Figure 3:
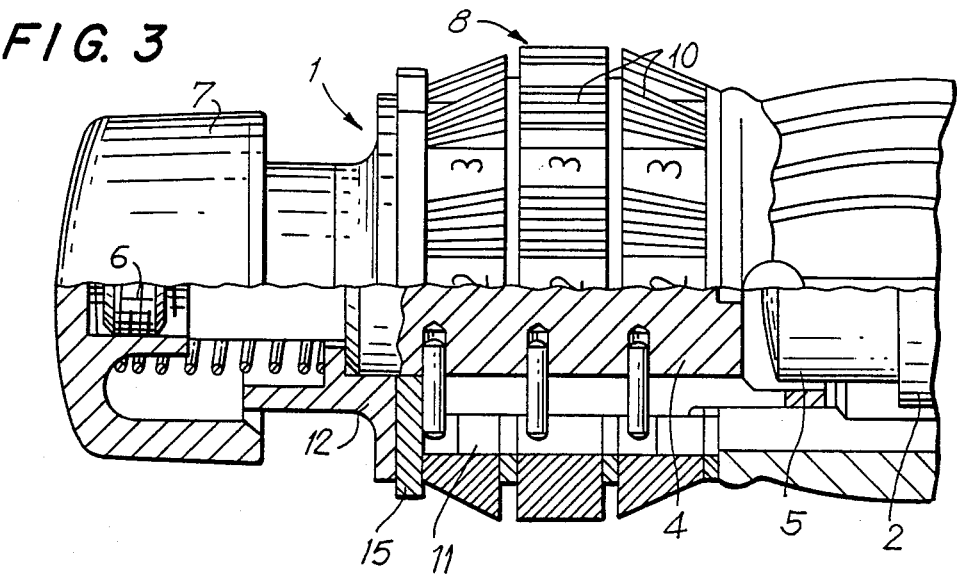
Figure 4:
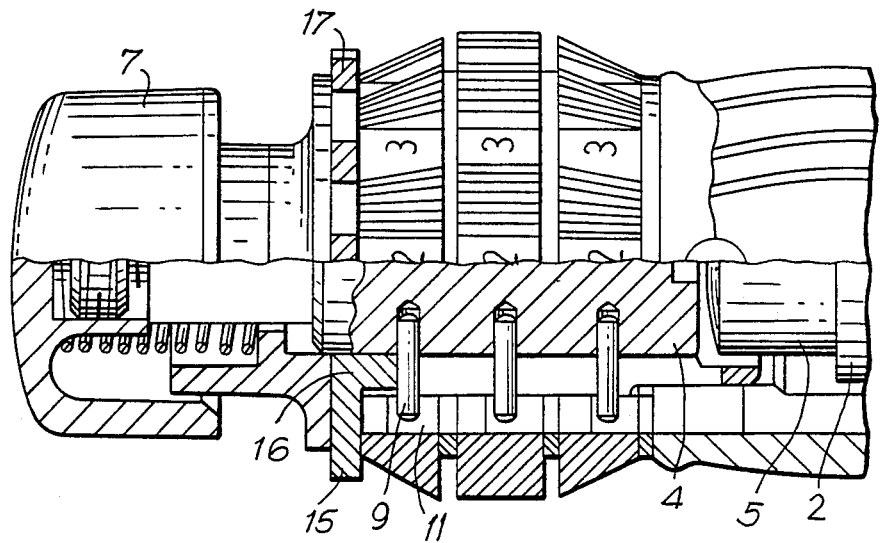
Figure 5:
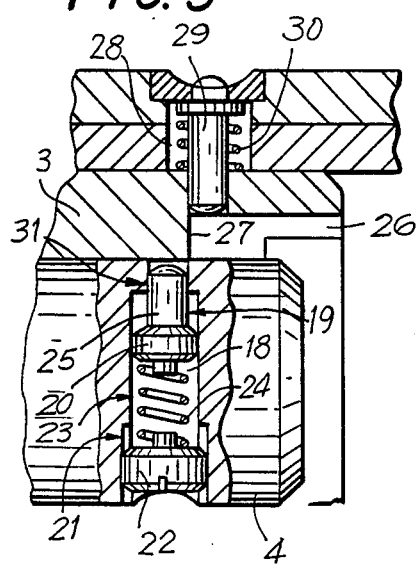
Figure 6:
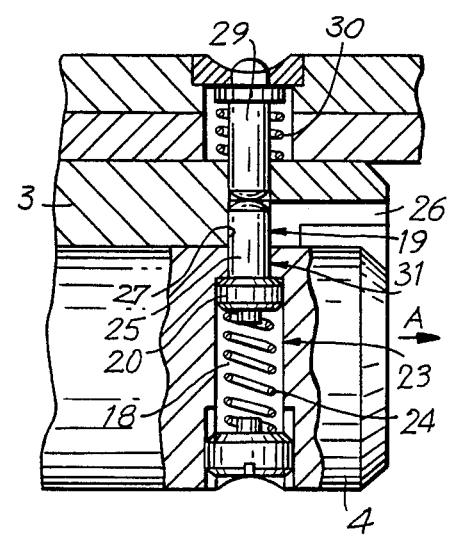
Figure 7:
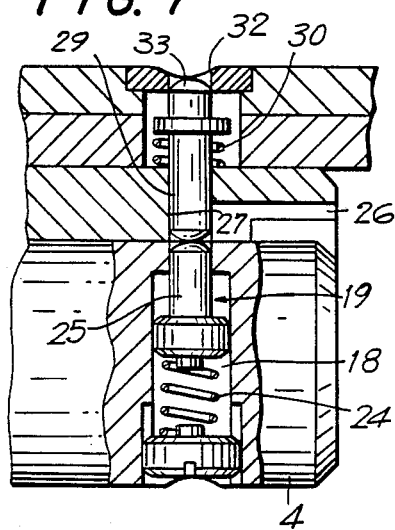
Figure 8:
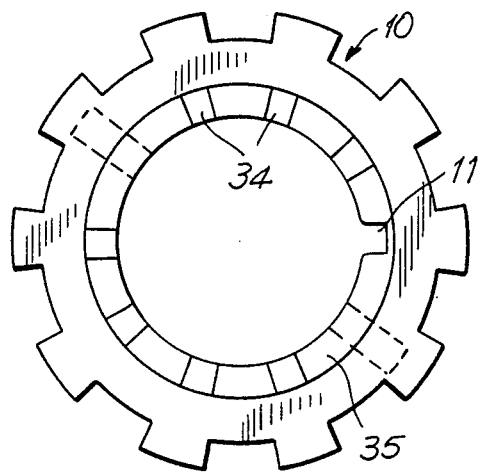
Figure 9:
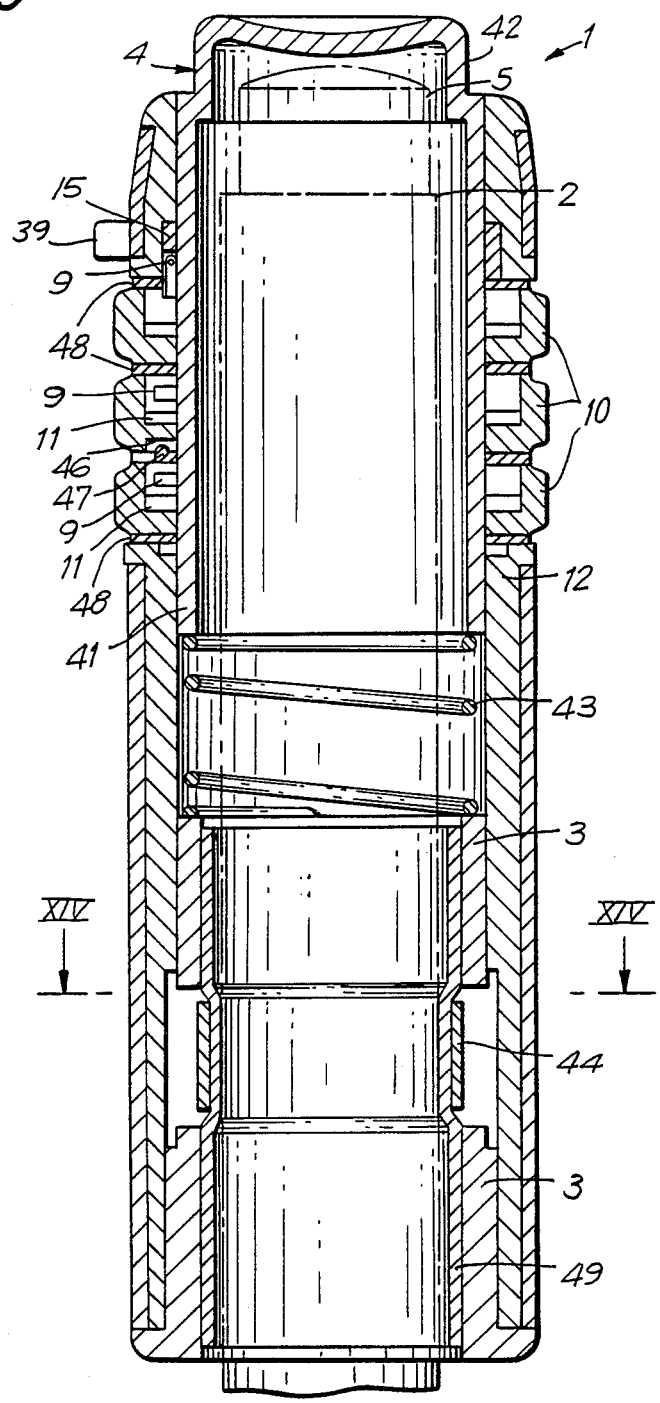
Figure 10:
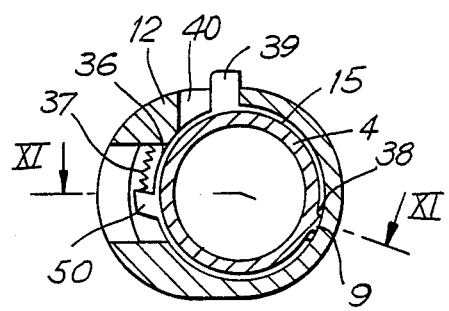
Figure 12:
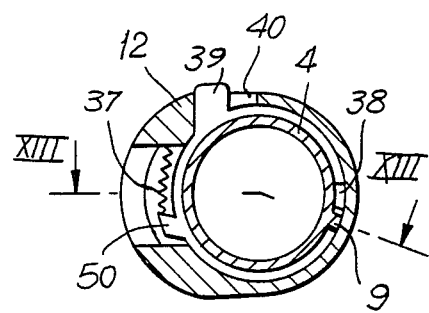
Figure 11:
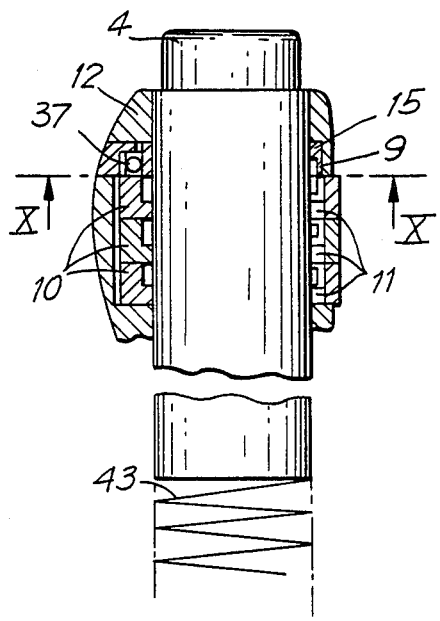
Figure 13:
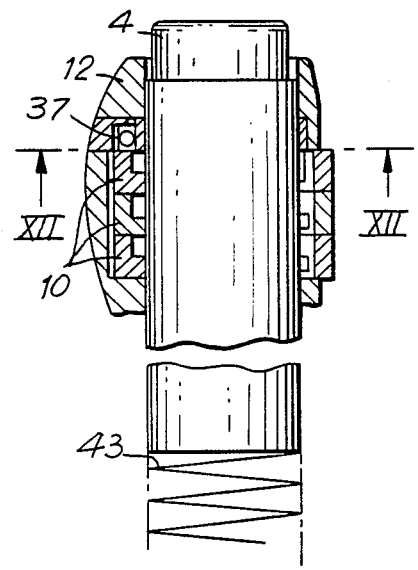
Figure 14:
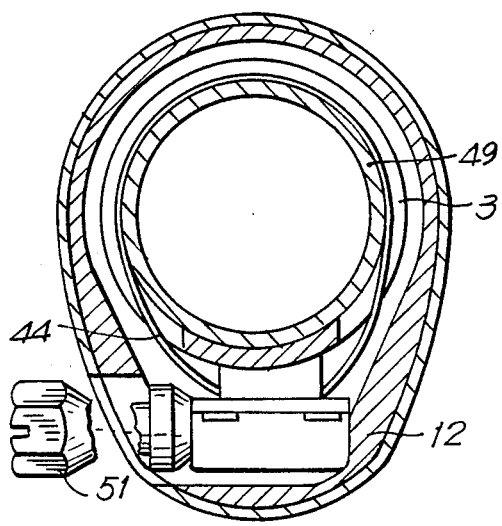
Figure 15:
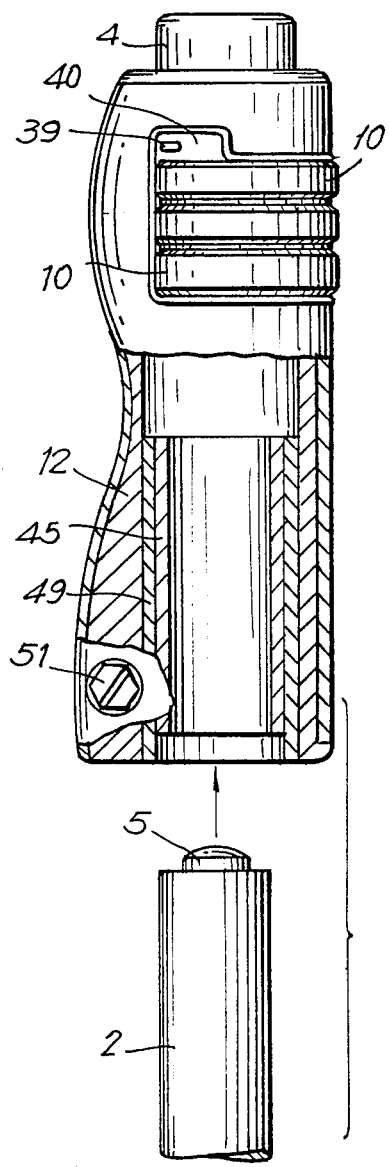
Figure 16:
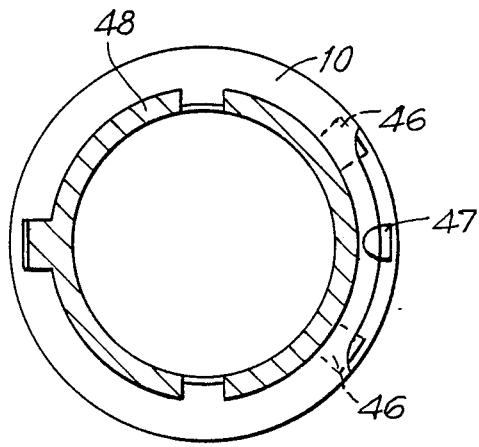

Further details of the invention will be described in more detail with the aid of the preferred embodiments with reference to the accompanying drawings. The drawings show:

FIG. 1—the half sectional view of a first preferred embodiment in the initial position, FIG. 2—the same view in the arrested position, FIG. 3—the half sectional view of a further preferred embodiment in the initial position, FIG. 4—the same embodiment in the arrested position, FIG. 5—the section of a part of a further preferred embodiment in the initial position, FIG. 6—the section of FIG. 5 in the arrested position, FIG. 7—the section of FIG. 5 during the release of the arrested position, FIG. 8—the plan view of a number dial in accordance with the invention, FIG. 9—a longitudinal section of a further preferred embodiment in the initial position, FIG. 10—a cross section through the lock along line X—X, FIG. 11—a section through the lock along line XI—XI, FIG. 12—a cross section through the lock in the arrested position along line XII—XII, FIG. 13—a section through the lock along the line XIII—XIII, FIG. 14—the unremovable fastening of the lock on the hand brake lever in accordance with a cross section along the line XIV—XIV, FIG. 15—a further preferred embodiment with the control window and an intermediate sleeve, partially sectioned and FIG. 16—a section through the lock of FIG. 9 along the line XVI—XVI.

A sleeve 3 of the lock 1 is mounted on the hand brake lever 2 and is fastened thereon in a suitable manner, for example, with bolts (not shown). In the sleeve 3 a longitudinally displaceable release member 4 is arranged, by means of which the pushbutton 5 of the hand brake can be pressed in. A cap 7 is fastened on the other end of the release member 4 by means of a bolt 6. Cap 7 serves as the control button of the lock.

The release member 4 is, as is customary in such locks, associated with a locking device 8 which serves to prevent movement of the release member 4 in the locked condition (see, for example, GB-PS No. 1,088,853). For that reason locking pins 9 are secured in the release member 4, which pins can cooperate with number dials 10. The dials 10 can each be provided with textured periphery, whereby the dials can be easily turned. The notches 11, which are formed as through channels, are arranged in the number dials 10 and can be turned to align with one of the locking pins 9, whereby longitudinal displacement of the release member 4 is rendered possible.

In FIG. 1 the lock is shown in the initial position, whereby the release of the hand brake by means of displacement of the release member 4 and pressing in of the pushbutton 5 is made possible. At the same time the disadvantage of the known solution mentioned in the introduction, for example, the unintended displacement of the dial, can occur. To eliminate this disadvantage the lock 1 of the invention is provided with a mechanism which arrests the locking device in the unlocked condition after release of the hand brake and prevents the shifting of the dials from the unlocked condition. For that purpose, in the preferred embodiment of FIG. 1 a projection 13 is built on a housing 12 which is connected with the sleeve 3, which projection has a half-thread extending over half of the periphery of the housing 12. In order to enable cooperation, a lip 14 is formed on the cap 7 which, like the part of the arresting mechanism, has a half-thread extending over half of the periphery of the cap 7 (FIG. 2).

In FIG. 2 the lock 1 of the invention is shown in the arrested position, whereby the half-thread of the projection 13 and the half-thread of the lip 14 lie against each other. This position can be reached in the released condition of the locking device 8 by pushing in the cap 7 and thereby the release member 4, and at the same time by turning the cap 7. The slightly pushed-in position of the release member is thereby fixed, whereby the locking pins 9 by this time find themselves inside the notches 11. Under these circumstances the number dials 10 of the locking device 8 cannot be moved unintentionally and the locking device 8 is arrested in the unlocked condition.

As is evident from FIG. 2, this pressing in of the release member 4 in the arrested position is not sufficient to also press in the press button 5 of the hand brake lever and thereby release the hand brake of the motor vehicle. In this arrested position the hand brake can thus be released by further pressing in of the cap 7, for example, by means of simple screwing in. In a danger situation therefore the hand brake can be actuated repeatedly without the locking device 8 being moved, and thereby release in this situation is rendered impossible.

Another solution to the same problems is the preferred embodiment of the invention depicted in FIG. 3. This embodiment has a cap 7 fastened onto the release member 4 by means of bolt 6 and a housing 12, but differs somewhat from the embodiment of FIG. 1 in that no projection 13 and no lip 14 are provided. Instead an arresting disk 15 is provided between the first number dial 10 from the cap 7 and the housing 12, arresting disk 15 being rotatable about the same axis as the number dials 10. On the surface of the arresting disk 15 which faces the blocking pin 9 of the first number dial 10, a shoulder 16 is formed which extends along half of the circumference of the arresting disk 15 at this diameter (FIG. 4). The thickness of the shoulder 16 is smaller than the thickness of a number dial 10. The arresting disk 15 is provided with fluting 17 by means of which rotation of the arresting disk is facilitated.

In FIG. 3 the notches 11 of the number dials 10 are aligned so that the locking device 8 is in the unlocked position. The cap 7 and thereby the release member 4 can hence be pressed in, whereupon the arresting disk 15 can be rotated from the position shown in FIG. 3 to the arresting position shown in FIG. 4. Thereby the locking pins 9 are held in the notches 11 of the number dials 10 and counteract rotation of the number dials. The above-defined displacement of the release member 4 is not sufficient to bring the release member 4 into contact with the pushbutton 5 of the hand brake, so that the release of the hand brake is not effected as a result.

FIGS. 5-7 show a further embodiment of the arresting mechanism whereby only one part of the lock 1 is shown in partial section, namely the end of the release member 4 which faces the pushbutton 5 of the hand brake. The release member 4 has a through-hole 18 formed therein, the axis of the through-hole being perpendicular to the longitudinal axis of the release member, wherein a stop pin 19 is arranged in the through-hole. The through-hole 18 has a first section 21 which is threaded, in which bolt 22 is screwed. In the next, i.e. second, section 23 of the through-hole, having a diameter less than the diameter of the first section, a head 20 of the stop pin 19 is slidably guided. A compression spring 24 is arranged in the through-hole 18 between the bolt 22 and the head 20 of pin 19. The stop pin 19 also has a shaft 25 which is guided in a third section 31 of the through-hole 18, the diameter of the third section 31 being smaller than that of the second section 23.

In the sleeve 3 of the lock 1 a longitudinal slot 26 is formed, the inner end of which defines the arresting position. At this position the sleeve 3 as well as the handle of the lock has a through-hole 28, in which a release pin 29 actuatable from the outside is arranged. The release pin 29 can be pressed into the longitudinal slot 26 from the outside against the opposing force of a compression spring 30.

The position shown in FIG. 5 corresponds to the locking position of lock 1, whereby the rounded end of the stop pin 19 lies against the inner surface of the sleeve 3. In the arrested position (FIG. 6) the compression spring 24 forces the stop pin 19 out of the through-hole 19 and into the longitudinal slot 26. As a result the head 20 of the stop pin 19 abuts against the inner shoulder between the second and third sections 23 and 31 of the through-hole 18. Further movement of the release member 4 in the direction of the pushbutton of the hand brake (indicated by arrow A) is not obstructed, since the shaft 25 of the stop pin 19 is freely movable in this direction. Movement in the opposite direction is prevented however by the shaft 25 lying against the inner end 27 of the longitudinal slot, whereby the holding of the locking pins 9 of the release member 4 in the notches 11 of the number dials 10 (see FIGS. 2–4) is achieved.

The release of this arresting position results with the help of the release pin 29. As previously mentioned, the shaft 25 of the stop pin 19 lies against the end 27 of the longitudinal slot 26, whereby the stop pin 19 is coaxial with the release pin 29. The rounded end 33 of the release pin 29, which protrudes into a concave depression 32 in the handle, can thus be pressed in, whereby the stop pin 19 is also pushed back into the through-hole 18 (as shown in FIG. 7). After the rounded end of the stop pin 19 reaches the inner surface of sleeve 3, the end can slide freely along the sleeve inner surface, by means of which the locking pins 9 leave the notches 11 of the number dials 10 and the locking position of the lock is arrived at. The amount of compressive force acting on the stop pin 19 can be adjusted by means of the bolt 22.

To enhance the security of the lock 1 in accordance with the invention, dummy notches 34 are provided on the number dials 10 like those visible on the number dial 10 separately depicted in FIG. 8. The dummy notches 34 are formed in an annular surface 35 of the number dial 10, each dummy notch being able to only partly admit the locking pin 7, so that pushing through of the locking pin is not possible. This prevents discovery of the position of notch 11 externally without knowledge of the numeric combination and consequent unlocking of the lock 1.

A further embodiment of the lock according to the invention is depicted in the sectional view of FIG. 9. In this case the released member 4 is formed as a sleeve 41 which can be placed over the hand brake lever 2 and ends in a control knob 42. The lock 1 is mounted on the hand brake lever 2 in a non-removable manner by means of a special one-way clamp 44 placed around an inner sleeve 49. The release member 4 is constantly loaded by a compression spring 43 arranged inside the sleeve 3 of the lock 1 coaxially encircling the hand brake lever 2. In this initial position the locking pins 9 are outside of the notches 11, so that the number dials 10 can be freely rotated. To better understand, this position is depicted in detail in FIGS. 10 and 11. In a recess 36 of the housing 12 of lock 1 a compression spring 37 is inserted which abuts against a projection 50 on the arresting disk 15. A radial control lever 39 on the arresting disk 15 projects through a control window 40 in the lock 1, and the first locking pin 9 of the release member 4 engages a groove 38 on the face of the arresting disk 15, so that the arresting disk 15 cannot rotate under the influence of compression spring 37. It is evident in FIG. 11 that the afore-mentioned first locking pin 9 of the release member 4 is longer in the axial direction than the second and third locking pins 9. All three of the locking pins 9 however are outside of the notches 11 and the number dials can be freely rotated.

FIGS. 12 and 13 depict the lock 1 in a position wherein unintentional rotation of the number dials 10 is prevented. This position can be arrived at in such a way that the control knob 42 of the release member 4 is pressed in slightly, so that the first locking pin 9 leaves the front groove 38 of the arresting disk 15 and the compression spring 37 rotates the released arresting disk 15 until the control lever 39 strikes the opposing edge of control window 40. Now all three locking pins 9 of the release member 4 are located inside the respective notches 11 of the number dials 10 (see FIG. 13), whereby rotation of the number dials 10 is prevented.

The adjustment of the number dials 10 can be enabled by the return of the control lever 39 to its original position.

In accordance with a further embodiment of the invention, the lock 1 does not have a separate compression spring 43, but on the contrary the lock 1 during assembly is slid so far onto the hand brake lever 2 until the pushbutton 5 abuts the inner surface of the control knob 42 in the unlocked state of the locking device 8. In this case the original compression spring of the pushbutton 5 of the hand brake takes over the role of compression spring 43.

FIG. 14 depicts one possible way of non-removably mounting the lock 1 on the hand brake lever. The inner sleeve 49 of the lock 1 has a clamp 44 wrapped therearound, the locking screw 511 being dimensioned such that the head of the screw easily breaks off after full tightening of the clamp, so that the clamp cannot thereafter be removed.

FIG. 15 shows the arrangement and mounting of lock 1 on the hand brake of a motor vehicle. Because the hand brake lever 2 of the hand brake has a relatively smaller diameter, an intermediate sleever 45 is inserted between the hand brake lever 2 and the inner sleeve 49 of the lock 1. From FIG. 15 the structure of the control window 40 and the arrangement of the control lever 39 of the arresting disk 15 relative to the number dials 10 can be understood. A suitable opening for the free access of the locking screw 51 of the clamp 44 is formed in housing 12 of the lock 1.

To ensure well-defined adjustment of the number dials 10, an advantageous latching arrangement is provided. This latching arrangement comprises three annular springs 48, which are arranged next to the number dials, coaxial therewith and secured against rotation, and further comprises radial depressions 46 formed in the front surface of the number dials 10. The number of these depressions is equal to the number of numbers on the number dials. A preferred embodiment of such an annular spring 48 is shown in FIG. 16 and the arrangement of the annular springs 48 is shown in FIG. 9. Each annular spring has a projection 47 which latches in one of the depressions 46 in the corresponding position of the associated number dial 10 and in this way the adjusted position of the number dial is secured.

As is evident from the foregoing, the lock according to the invention completely conforms to international safety regulations as well as the increased demands of daily use of such arrangements, whereby the lock 1 scarcely extends beyond the original length of the hand brake.

We claim:

1. A lock for a hand brake lever of a motor vehicle with a sleeve mounted on the hand brake lever, a release member movable with respect thereto to contact a pushbutton of the hand brake lever, and a locking device capable of preventing movement of the release member in a locked condition, characterized in that the release member (4) is associated with a mechanism which arrests an unlocked condition of the locking device (8) after release of the hand brake and prevents shifting from this condition.

2. The lock according to claim 1, characterized in that the mechanism which prevent shifting of the locking device has a cap (7) and a projection (13) provided on a housing (12) of the lock (1) which cooperates with the cap in an arrested position, whereby the cap (7) and the projection (13) are relatively movable.

3. The lock according to claim 2, characterized in that the projection (13) is formed on the end of a sleeve (3) which faces the cap (7), and the cap (7) has a lip (14), whereby the projection (13) and the lip (14) are formed with threads of large pitch extending respectively over half the periphery of the cap and sleeve, and the halfthread of the projection (13) cooperates with the halfthread of the cap (7) in the arrested position.

4. The lock according to claim 3, characterized in that a rotation blocking shoulder is formed on relatively movable surfaces of the half-threads of the projection (13) and the lip (14).

5. The lock according to claim 3, characterized in that the thread pitch of the half-threads of the projection (13) and the lip (14) is smaller in the axial direction than the thickness of a number dial (10) of the locking device (8).

6. The lock according to claim 1, characterized in that an arresting pin (19) is arranged in a through-hole (18) perpendicular to the longitudinal axis in the end of the release member (4) which faces the pushbutton (5) of the hand brake lever (2), whereby in an arrested position an arresting pin (19) abuts the inner end (27) of a longitudinal groove (26) formed in an sleeve (3) of the lock (1) and cooperates with an externally actuated release pin (29) which pushes the arresting pin out of the longitudinal groove (26).

7. The lock according to claim 6, characterized in that the arresting pin (19) has a head (20) with a diameter greater than that of the remaining part, which in the arrested position abuts an inner annular shoulder of the through-hole (18) and is loaded with a compression spring (24).

8. The lock according to claim 6, characterized in that the externally actuated release pin (29) is arranged in a through-going hole (28) formed in the handle of the hand brake lever (2) near the inner end (27) of the longitudinal groove (26), whereby the outer end (33) of the release pin (29) is a button provided in a concavity (32) of the handle and the pin is loaded in the direction of the depression (32) by a compression spring (30).

9. The lock according to one of claim 7, characterized in that the compression force acting on the arresting pin (19) is adjustable by altering the prestress of the compression spring (24).

10. The lock according to one of claim 1, characterized in that the number dials (10) of the locking device (8) at least partially admit the locking pins (9) of the locking device (8), but dummy notches are provided which prevent push-through of the pins.

11. The lock according to claim 1, characterized in that the lock is unremovably mounted on the hand brake lever (2) by means of a one-way clamp (44).

12. The lock according to one of claim 1, characterized in that the lock has an intermediate sleeve (45) for hand brake levers (2) with smaller diameter.

13. The lock according to claim 1, characterized in that said locking device includes a plurality of number dials having a common axis of rotation.

14. The lock according to claim 13, characterized in that an arresting disk (15) is rotatably arranged between a first number dial (10) of the lock device (8) and a housing (12) of the lock (1) coaxial with a plurality of number dials (10), which arresting disk has a shoulder (16) that abuts one of a plurality of locking pins (9) of the locking device (8) in the arrested position, whereby the annular shoulder (16) extends over half of the arresting disk and has a thickness smaller than the thickness of a number dial (10).

15. The lock according to claim 14, characterized in that the arresting disk (15) is provided with an outer fluting (17).

16. The lock according to claim 13, characterized in that between a first number dial (10) of the locking device and a housing (12) of the lock, an arresting disk is arranged coaxial with the number dials (10) and is rotatable by means of a compression spring (37) seated in a recess (36) of the housing (12), a first locking pin (9) of the release member (14) engaging a groove (38) in a front face of the arresting disk when the locking device (8) is in the unlocked condition, and the arresting disk (15) is provided with a radial control lever (39) which projects through a control window (40) of the lock.

17. The lock according to claim 16, characterized in that the release member (4) is formed as a sleeve (41) fixed on the hand brake lever (2), which sleeve ends in a control knob (42) the inside of which abuts the pushbutton (5) of the hand brake.

18. The lock according to claim 16, characterized in that the release member (4) is formed as a sleeve (41) fixed on the hand brake lever (2), which sleeve ends in a control knob (42) and which is loaded by a compression spring (43) arranged inside the sleeve (3) of the lock.

19. The lock according to one of claim 13, characterized in that each front surface of each number dial (10) of the locking device (8) is provided with a plurality of radial recesses (46), the number of recesses being equal to the number of digits on the number wheels (10), which recesses cooperate with projections (47) provided on annular springs (48) coaxially arranged next to the number dials (10), which maintain the adjusted position of the number dials (10).

* * * * *